United States Patent [19]

Skahill

[11] 4,184,712
[45] Jan. 22, 1980

[54] ENCLOSURE MECHANISM FOR ROLL OVER PROTECTIVE STRUCTURE

[75] Inventor: Richard J. Skahill, Bettendorf, Iowa

[73] Assignee: J. I. Case Company, Racine, Wis.

[21] Appl. No.: 906,693

[22] Filed: May 16, 1978

[51] Int. Cl.² .............................................. B62D 27/00
[52] U.S. Cl. ................................... 296/190; 280/756
[58] Field of Search .................. 296/28 C, 35 R, 102, 296/137 R; 180/89.12, 89.19; 280/756

[56] References Cited

U.S. PATENT DOCUMENTS

| | | | |
|---|---|---|---|
| 2,997,333 | 8/1961 | Kauffman | 296/28 C |
| 3,055,699 | 9/1962 | May | 296/28 C |
| 3,191,987 | 6/1965 | Dodge | 296/102 |
| 3,632,134 | 1/1972 | Babbitt | 280/756 |
| 3,843,191 | 10/1974 | Rediger | 296/28 C |
| 3,881,769 | 5/1975 | Metzke | 296/28 C |
| 3,954,150 | 5/1976 | Cole | 296/28 C |
| 4,079,985 | 3/1978 | Martin | 296/28 C |

Primary Examiner—Philip Goodman
Attorney, Agent, or Firm—Dressler, Goldsmith, Clement, Gordon & Shore, Ltd.

[57] ABSTRACT

An enclosure kit for enclosing an open roll over protective structure of a vehicle includes four panels that have connector means associated therewith which can be connected to the roll over protective structure without changing the structural integrity thereof. The connector means includes a flange that is formed along one edge of each panel which is adapted to be received into a trough defined along the upper edge of the roll over protective structure and releasable retainers for connecting each of the panels to vertical posts of the roll over protective structure. The releasable retainers are readily clamped onto the vertical posts and are designed to have two edges of adjacent panels connected thereto with the connection including a shock absorbing member.

13 Claims, 7 Drawing Figures

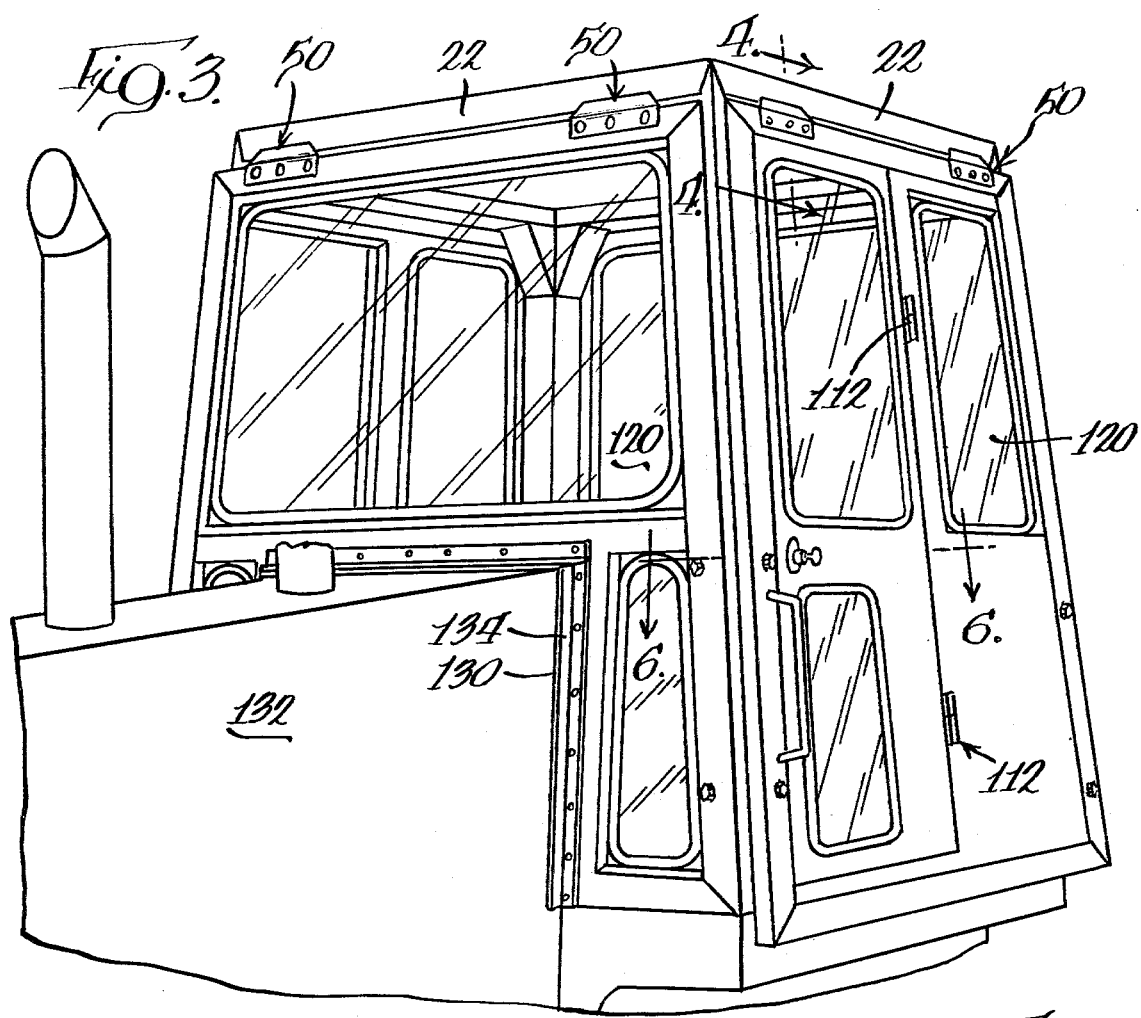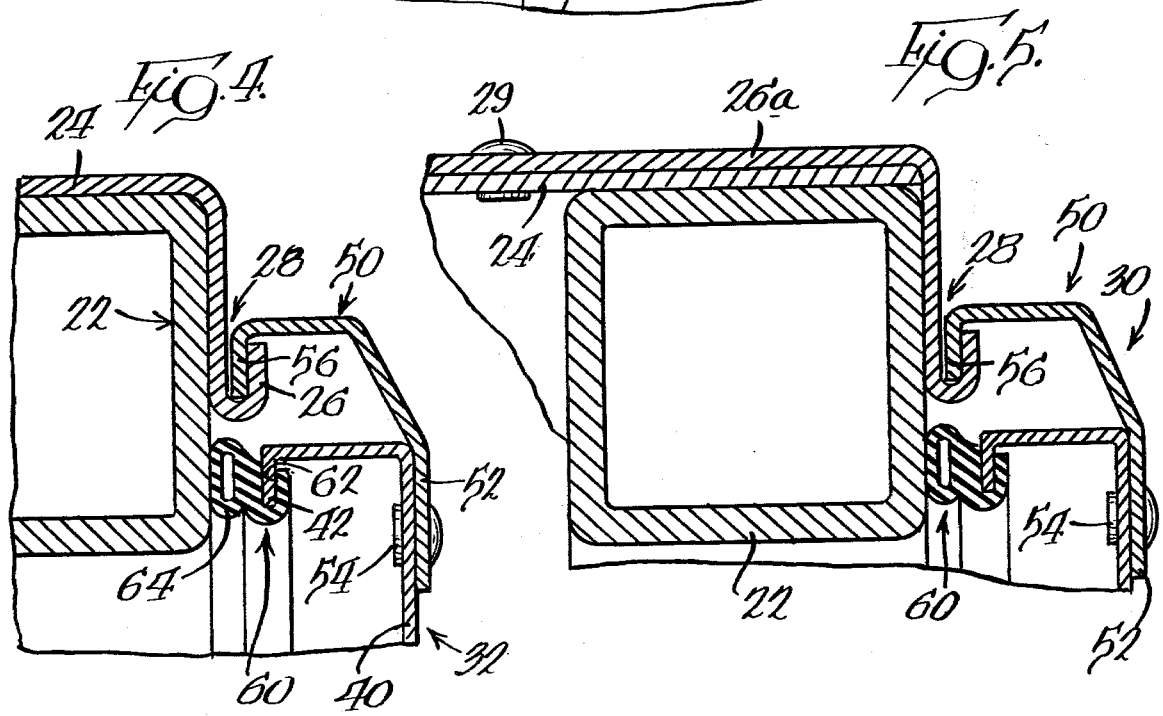

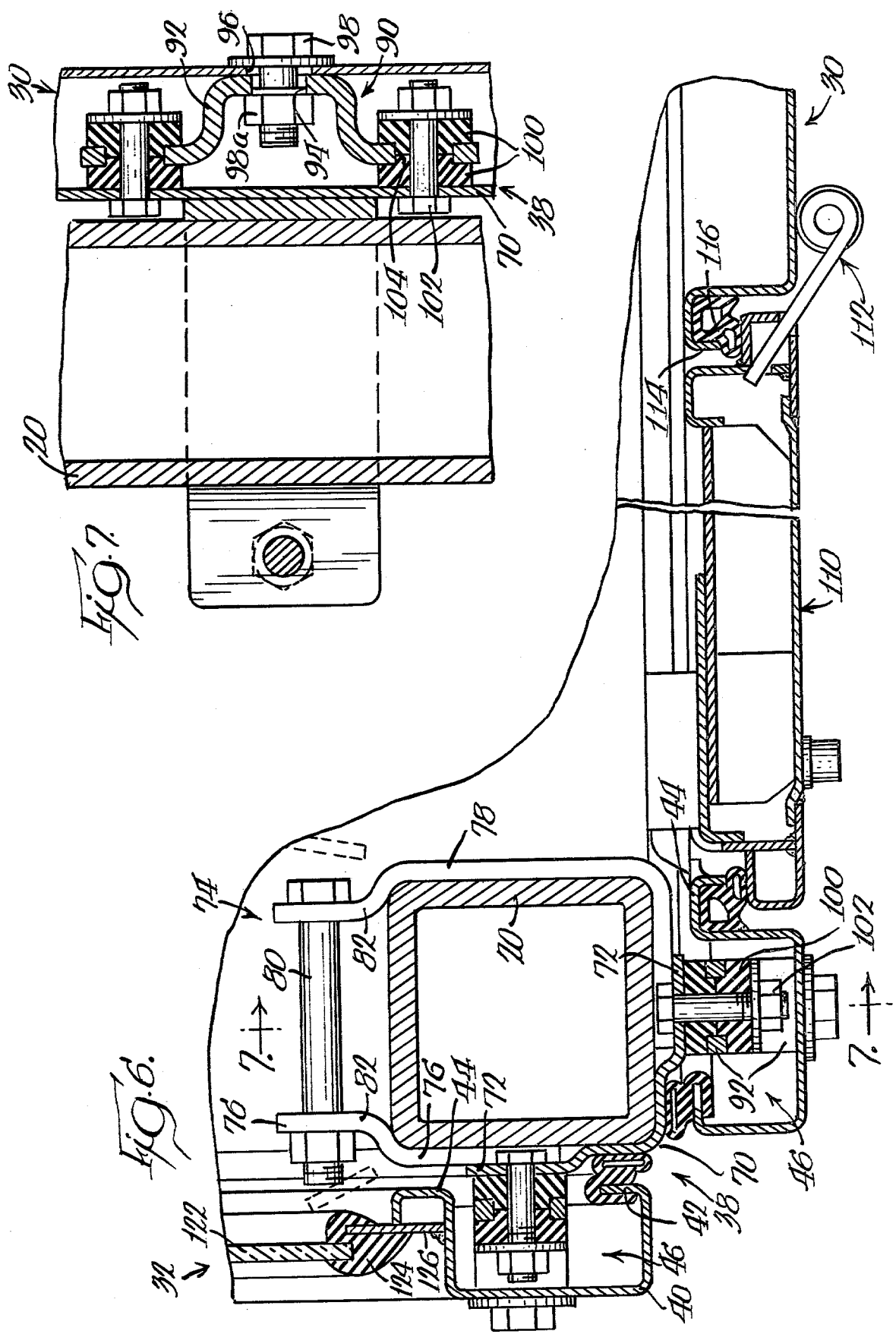

ENCLOSURE MECHANISM FOR ROLL OVER PROTECTIVE STRUCTURE

BACKGROUND OF THE INVENTION

The present invention relates generally to industrial and agricultural vehicles which have roll over protective structures associated therewith and more particularly to an improved enclosure for isolating the operator's compartment of the vehicle from the elements.

In recent years, federal regulations have made it mandatory to include some type of protective structure around the operator's compartment of a vehicle to protect the operator from injury should the vehicle be overturned. In order to comply with these federal regulations, each individual protective structure must be approved by appropriate agencies before it can be adopted for a particular machine. Each time there is a change to such protective structure, which may be of even minimal significance, it is necessary to have the structure reapproved for future use. In addition, any time there is any change in the structural integrity of the protective structure, such as a hole drilled in the framework that forms the protective structure, the protective structure no longer meets the federal requirements.

To meet these requirements, industrial and agricultural vehicles are presently furnished with some type of roll over protective structure as standard equipment. However, should a particular customer desire an enclosed operator's station, a customer must order a specific type of roll over protective structure which incorporates the enclosure for the operator's station. At the present time, most such roll over protective structures are constructed as separate items and then are attached to the remainder of the vehicle frame. Therefore, if a customer purchases a certain unit such as an open roll over protective structure as standard equipment when the vehicle is purchased and subsequently decides that an enclosed cab is desirable or necessary, the customer must remove a portion of the original equipment which must be discarded and results in a portion of the original purchase price being a wasted expenditure.

Another problem encountered with roll over protective structures is that when a customer decides to order a vehicle with an enclosed cab that also incorporates the roll over protective structure, such units do not have the capability of readily being converted to an open structure for the operator's compartment.

SUMMARY OF THE INVENTION

According to the present invention, a unique enclosure kit has been developed which can readily be attached to any open type roll over protective structure to provide a substantially sealed enclosure for the operator thereby protecting him from the elements.

The various components of the enclosure kit are designed so that the entire kit can be attached to a vehicle without varying the structural integrity of the original roll over protection structure and also can be subsequently removed and reattached whenever desired.

The enclosure kit of the present invention consists of four panels and four releasable retaining means for releasably securing the respective panels to the roll over protective structure. More specifically, the enclosure kit is adapted for enclosing a roll over protective structure that consists of four generally vertical corner posts that are interconnected at their upper ends by four generally horizontal beams or posts which have an upwardly directed trough around the perimeter and a roof extending between the horizontal beams.

Each of the panels has a sealing element extending around the entire periphery thereof which is adapted to cooperate with the surfaces of the vertical corner posts and the horizontal beams and a flange extending along at least a portion of one edge of the panel which is adapted to be received into the upwardly directed trough to suspend the panel from the horizontal beam.

Each releasable retaining means for the various panels is adapted to be attached to a vertical corner post without any drilling or welding and consists of a clamp which surrounds the corner post and connector means between the clamp and the panel with the connector means incorporating vibration absorbing means that isolate the panel from the corner post. In the specific embodiment, one releasable retaining means is designed for attaching two edges of respective panels to one corner post and isolating each panel from the corner post. This is accomplished by utilizing a corner element that has two legs extending substantially perpendicular to each other so that it may be wrapped around an outside corner of a hollow generally rectangular vertical post and each corner element is connected to the corner post by two vertically spaced clamps that can be held on the post by frictional engagement therewith.

BRIEF DESCRIPTION OF THE SEVERAL VIEWS OF THE DRAWINGS

FIG. 3 is an enlarged fragmentary perspective view showing the enclosure kit in slightly greater detail;

FIG. 4 is a fragmentary sectional view as viewed along line 4—4 of FIG. 3;

FIG. 5 is a view similar to FIG. 4 showing a slightly modified form of vehicle;

FIG. 6 is an enlarged fragmentary sectional view as viewed generally along line 6—6 of FIG. 3; and FIG. 7 is an enlarged fragmentary sectional view as viewed along line 7—7 of FIG. 6.

DETAILED DESCRIPTION

Figure 1:
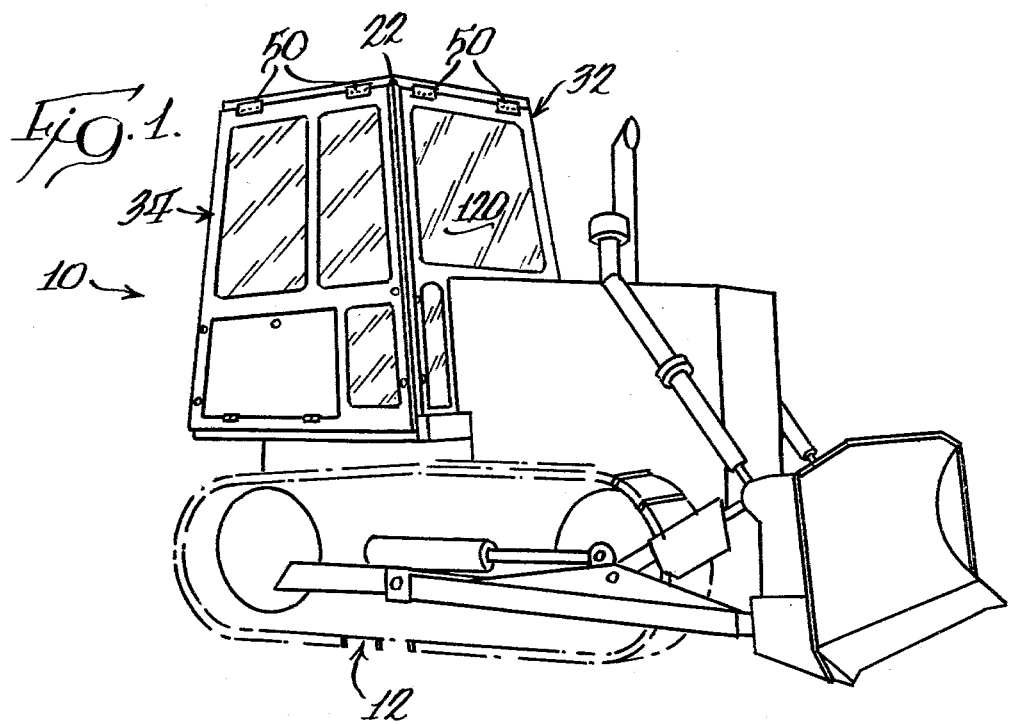
FIG. 1 shows a perspective view of an industrial vehicle having the enclosure kit of the present invention incorporated therein.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

Figure 2:
FIG. 2 is an exploded view similar to FIG. 1 showing the four panels and the vehicle.
Figure 2:
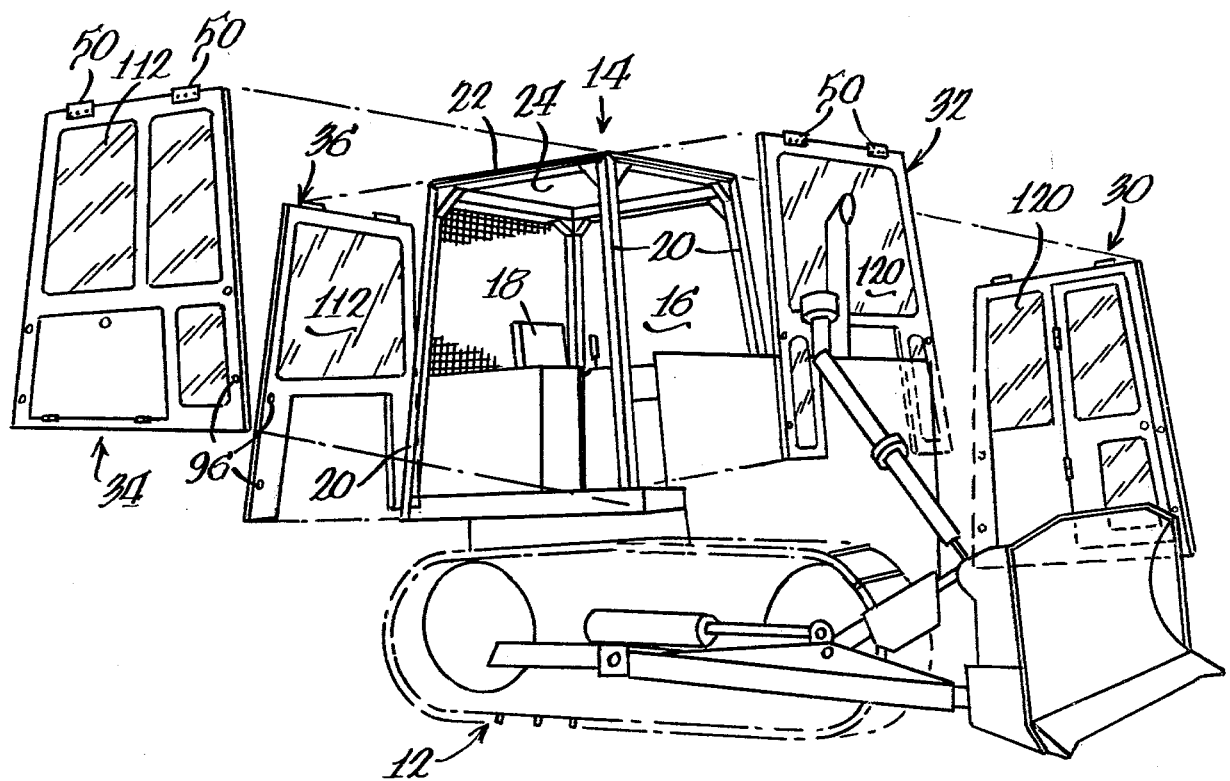

FIG. 1 of the drawings shows a vehicle generally designated by reference numeral 10 and for illustrative purposes vehicle 10 has been shown as a crawler tractor unit 12 which has a roll over protective structure 14 (FIG. 2) generally enclosing an operator's station 16 having an operator's seat 18 located therein. The roll over protective structure 14 includes four hollow generally vertical posts 20 all of which are interconnected at their upper ends by hollow horizontal posts or beams 22 to define a supporting structure surrounding operator's station 16 that prevents injury should the vehicle be overturned. In most instances the roll over protective structure 14 also has a roof 24 which extends between horizontal beams 22 to provide a cover structure for protecting the operator from rain and direct exposure to the sun. Many of these structures also incorporate a rain gutter 26 which extends around the perimeter of horizontal beams or posts 22 adjacent the upper end of the structure and rain gutter 26 defines a generally upwardly opening U-shaped trough or recess 28 which may be defined as an integral extension of roof 24 (FIG. 4) or may be a separate member 26a (FIG. 5) that is attached to roof structure 24 through a rivet or other suitable connection 29 which preferably has a sealing element (not shown) to seal the space surrounding the opening which receives the rivet.

As indicated above, the roll over protective structures that are incorporated into vehicles of this type must be approved by a federal regulatory agency prior to its incorporation into the vehicle of the type under consideration. Normally such approval is conditioned upon all future units being built without any changes in the overall structure. This means that there can be no welding or drilling of any holes in the basic protective structure or the roll over protective structure will not be considered as an approved unit for its intended purposes.

It should also be pointed out that normally such roll over protective structures are designed to be attached to a basic frame structure of any type of vehicle with conventional connections so that a structure, once it has been approved, can be utilized for several different machines. Thus, it has become rather customary for the lower ends of the generally vertical corner posts 20 to incorporate a generally C-shaped clevis structure which can be utilized for attaching the protective structure to any conventional vehicle utilizing standard bolts.

As indicated above, every time there is any change in configuration of the roll over protective structure or any change in the structural components for the structure, the entire unit must be resubmitted for approval. Thus, it is standard practice for a manufacturer of vehicles and roll over protective structures of this type to condition its warranty for the roll over protective structure upon maintaining the entire unit in its original condition as received from the manufacturer. Once there has been a change in the unit, however insignificant, such as by welding an attachment to the unit, or drilling a hole in any part of the unit, the manufacturer's warranty is no longer valid.

According to the present invention, a standard open type roll over protective structure can readily be converted into a closed cab without changing the structural integrity of the protective structure. This is accomplished with an enclosure kit that can be sold as a separate unit with the vehicle or at a subsequent time and one which can be attached to and removed from the vehicle roll over protective structure whenever desired.

The enclosure kit consists of four panels 30, 32, 34 and 36 (FIG. 2) each of which has a slightly different configuration but all of which incorporate many common elements and releasable retaining means 38 (FIGS. 6 and 7) which can be attached to the vertical posts 20 without affecting the structural rigidity of the post. The details of the various panels and their interconnection with the roll over protective structure 14 will be described specifically in connection with panels 30 and 32. Referring specifically to FIG. 6, panels 30 and 32 each have a generally channel shaped member 40 extending around a major portion of the periphery thereof and channel shaped member 40 has an inwardly directed flange 42 that defines a free exposed edge which will be described later. The inner periphery of channel 40 has a substantially U-shaped element 44 while an intermediate portion defines a generally open recess 46 for receiving a connector, as will be described later. The upper edge of each of the panels 30–36 has a pair of generally U-shaped clips 50 (FIG. 2) secured thereto and each clip 50 has one leg 52 which is secured to a channel 40 through a rivet or other connection 54 while the opposite leg 56 defines a flange which is adapted to be received into the U-shaped trough or recess 28 to suspend the entire panel from the hollow upper horizontal beam or post 22 associated therewith.

The free edges or flanges 42 of the respective peripheral channels 40 of each of the panels have sealing elements 60 (FIGS. 4 and 5) associated therewith and each sealing element 60 is in the form of an elastomeric member that has a continuous slot 62 for receiving free edge 42 and a collapsible portion 64 which has an opening extending therethrough. Sealing element 60 will provide a frictional seal between each of the panels and an associated post or beam which will not only prevent rain, snow or dust from entering the enclosure but will also act as an isolating member for isolating the panels from the rigid frame structure or roll over protective structure to reduce vibrations of the respective panels on the vehicle.

The enclosure kit also incorporates four releasable retaining means or members 38, all of which are identical in construction to reduce the inventory of necessary parts for the enclosure kits. As illustrated in FIGS. 6 and 7, each releasable retaining means 38 includes a generally L-shaped corner element 70 which is adapted to extend around the outer peripheral corner of each vertical hollow rectangular post 20 and has outwardly offset edge portions 72. A clamp 74 and preferably two vertically spaced clamps are connected to the respective corner elements.

In the illustrated embodiment, each clamp 74 consists of a first member 76 that is secured to one offset portion 72, as by welding, and a second generally L-shaped member 78 that is secured to the opposite outwardly offset portion 72. Thus, members 76 and 78 cooperate with corner element 70 to define a generally C-shaped clamp which is adapted to surround corner post 20 and be frictionally retained thereon by a bolt 80. As illustrated in FIG. 6, members 76 and 78 each have an inwardly offset portion 82 which has openings for receiving bolt 80 to securely clamp corner element 70 to vertical post 20.

In its initial undeflected condition, releasable retainer means 38 including corner element 70 and members 76 and 78 have their free end portions 82 extending outwardly generally in the position illustrated in dotted lines in FIG. 6 and in this undeflected condition, the clamps 74 can readily be forced over the hollow rectangular vertical posts or columns 20 with the free edges acting as guide surfaces so that the retaining means can be positioned on the post without the use of any extraneous tools. After being assembled thereon, the respective bolts 80 for the pairs of clamps associated with each retaining means 38 are utilized for securing the retaining means on the respective corner posts.

According to another aspect of the invention, each of the releasable retaining means has connector means 90 (FIG. 7) for securing a pair of edges of adjacent panels, such as panels 30 and 32, to one of the hollow corner posts or columns 20. The connector means include a generally C-shaped bracket 92 that has an opening 94 in an intermediate portion which is adapted to be aligned with an opening 96 in one of the panels and interconnected with a bolt 98. The respective legs of bracket 92 are each adapted to be connected to one leg of corner element 70 through a vibration shock absorbing means that includes a pair of rubber washers 100 located on opposite sides of the legs with a bolt 102 extending through openings in the rubber washers 100 and an enlarged opening 104 in each of the legs. Thus, the rubber washers 100 act as vibration absorbing means for isolating each panel from an associated vertical post. Preferably, each corner element has two vertically spaced connectors 90 associated with each leg of the corner element 70 so as to provide vertically spaced connectors for the lower portion of the outer edges of each of the panels.

It should be pointed out at this time that while a single L-shaped corner element has been illustrated as being utilized for connecting two adjacent edges of two panels to a single post, such an arrangement could readily be modified to provide a single generally C-shaped clamp and a single connector 90 for each of the lower corners of the respective panels rather than the L-shaped corner element 70 and two vertically spaced clamps 74. Also, the particular configuration of the clamps could take a variety of forms and could likewise be a generally C-shaped single member which has a particularly configured supporting structure supported thereon for supporting one or more connectors 90 for one or more panels 30-36.

The particular configuration of the interior portions of the various panels could include a variety of elements and specific shapes have been illustrated for purposes of completeness. In the illustrated embodiment, left-hand panel 30, as viewed from operator seat 18, has a hinged door 110 form therein for gaining access to the enclosed space produced by the various panels. Door 110 is pivoted on panel 30 by hinges 112 and is designed to enclose an opening 114 in panel 30. An elastomeric sealing element 116 is received in channel 44 which surrounds the opening. Each of the panels also has at least one window 120 so that the operator has clear visibility in all directions. Windows 120 include a transparent plastic or glass material 122 (FIG. 6) that has a sealing element 124 around the periphery which is received on a retaining member 126. Of course, the various panels could have various other components incorporated into the intermediate portion depending upon the desires and needs for any given vehicle. Also, the particular configuration of each of the panels would be varied to satisfy the needs of a particular vehicle. For example in the illustrated embodiment, the forward panel 32 has a generally U-shaped opening 130 for surrounding the cowling 132 of the vehicle 10 and suitable sealing elements 134, in addition to the sealing elements described above, can be utilized for completely enclosing the entire operator's station.

It will be appreciated that from the above description, a vehicle having an open roll over protective structure 14 with or without a rain gutter 26 can readily be converted into an enclosed operator's station in a matter of minutes without making any changes or structural connections to any of the components of the roll over protective structure. In assembling the enclosure kit onto the roll over protective structure 14, it is only necessary for the operator to install four releasable retaining means 38 adjacent the lower corners of the respective vertical posts and vertically align the corner retaining means 38 so that openings 94 are positioned in a predetermined position with respect to the generally horizontal rain gutter or trough 28. Thereafter, the respective releasable retaining means 38 can be securely affixed to the vertical posts by tightening the various bolts 80 associated therewith. Each corner panel can then be attached by first inserting the downwardly directed flange or lip 56 into the upwardly open recess or trough 28 so that the panel is suspended from its upper edge. Thereafter, it is only necessary to insert the bolts 98 into the threaded nuts 98a, which could be welded to the inner surfaces of brackets 92, and the entire assembly is complete.

Once the various panels are assembled onto the roll over protective structure 14, the sealing elements 60 provide a frictional seal around the entire perimeter of each of the panels, particularly across the upper edge and along the vertical edges to exclude rain, dust or other foreign elements from the interior or operator's station. Also, the sealing elements isolate the panels from the remainder of the vehicle and act as vibration absorbing elements along with the rubber washers 100 which will minimize noise and vibration transmissions from the vehicle itself to the various panels which will reduce the noise level within the cab structure. Additional elastomeric members could also be interposed between the rain gutter 26 and flanges or lips 56 to further isolate the panel from structure 14.

Of course, any time the operator wishes to have an open cab structure, it is only necessary for him to remove four bolts 98a for each of the panels and lift the respective panels from the rain troughs or recesses 28 to produce an open cab structure. If such open structure is only desired for a short period of time, it is not necessary for the operator to remove the releasable retaining means 38 and in fact the operator can remove one or all of the respective panels to suit his own needs.

Various modifications could be made to the panels to adapt the panels to different vehicles. For example, some roll over protective structures may not have rain gutters 26. For this type of structure, downwardly directed flanges 56 could be directed horizontally and clips could be configured so that flanges 56 would rest on top of horizontal beams 22.

As can be appreciated from the above description, an open roll over protective structure can readily be converted into a closed operator's compartment utilizing the enclosure kit which can either be sold as a separate kit for a given vehicle or can be part of the standard equipment for a given vehicle. This will substantially reduce the cost of converting a vehicle without a cab structure to one with a cab structure. Also, the operator may readily convert his unit for different seasons to either an enclosed unit or an open unit depending upon his desires.

What is claimed is:

1. In combination with a vehicle frame having an operator's station with a roll over protective structure for protecting an operator and including four spaced generally vertical posts extending upwardly from the vehicle frame and surrounding said operator's station, four generally horizontal posts interconnecting the upper ends of said vertical posts with a roof enclosing the area between said horizontal posts, means defining an upwardly directed recess along at least a portion of the periphery of each horizontal post, and a cab structure for enclosing said operator's station, the improvement of said cab structure including four panels for respectively enclosing areas between adjacent pairs of vertical posts and one horizontal post, each panel having a flange along an upper edge adapted to be received in said recess of a horizontal post, a sealing element extending around the entire periphery of the panel adapted to seal and isolate the panel from adjacent posts, and releasable retaining means along at least the lower portions of vertical edges of each panel for releasably securing the panel to a pair of vertical posts so that each panel can readily be attached and removed from said roll over bar protective structure.

2. A combination as defined in claim 1, in which each releasable retaining means includes a corner element extending along an outer corner of each vertical post and at least one clamp encircling the vertical post for securing said corner element to the vertical post.

3. A combination as defined in claim 2, further including connectors for connecting adjacent edges of two adjacent panels to each corner element and further including vibration absorbing means in each connection between a corner element and a panel.

4. A combination as defined in claim 1, in which said releasable retaining means includes a clamp surrounding an adjacent vertical post and a releasable connector between said clamp and an adjacent edge of a panel.

5. A combination as defined in claim 1, in which each panel has a channel on the periphery of each panel and the channel has a free edge with said sealing element consisting of an elastomeric member received on said free edge and frictionally engaging a surface of a post.

6. In combination with a vehicle frame having an operator's station with a roll over protective structure for protecting an operator and including four spaced generally vertical posts extending upwardly from the vehicle frame and surrounding said operator's station, four generally horizontal posts interconnecting the upper ends of said vertical posts with a roof enclosing the area between said horizontal posts, means defining an upwardly directed recess extending around substantially the entire perimeter of said roof to define a trough, and a cab structure for enclosing said operator's station, the improvement of said cab structure including four panels for respectively enclosing areas between adjacent pairs of vertical posts and one horizontal post, each panel having a pair of spaced members along an upper edge and each having a flange into said trough to suspend said panel on said trough, a sealing element extending around the entire periphery of the panel adapted to seal and isolate the panel from adjacent posts, and releasable retaining means along at least the lower portions of vertical edges of each panel for releasably securing the panel to a pair of vertical posts so that each panel can readily be attached and removed from said roll over bar protective structure.

7. An enclosure kit for enclosing an operator's station of a vehicle having a roll over protective structure consisting of four generally vertical corner posts interconnected at their upper ends by four generally horizontal beams which have an upwardly directed trough around the perimeter and a roof between said horizontal beams comprising four panels each adapted to enclose an area between a pair of corner posts and one interconnecting horizontal beam and four vertical post releasable retaining means for releasably securing the respective panels to the vertical corner posts, each panel having a sealing element extending around the periphery adapted to provide a seal between the panel and adjacent posts and beams and a flange along at least a portion of one edge adapted to be received in said trough to suspend the panel from a horizontal beam, each releasable retaining means including at least one clamp for surrounding a vertical corner post adjacent a lower end thereof and connector means for releasably connecting an edge of a panel to the clamp so that all of the panels can be connected to the roll over protective structure without affecting the structural integrity of the roll over protective structure.

8. An enclosure kit as defined in claim 7, in which each connector means includes a corner element supported by said clamp and separate connectors between a corner element for connecting adjacent edges of a pair of panels to one corner element.

9. An enclosure kit as defined in claim 8, in which each connector includes vibration absorbing means for isolating the panel from the corner element.

10. An enclosure kit as defined in claim 9, in which each releasable retaining means includes a pair of spaced clamps secured to each corner element and a pair of spaced connectors on each corner element for each of the pair of panels.

11. An enclosure kit as defined in claim 10, in which at least one of the panels has a hinged door for gaining access to the operator's station and all of said panels have at least one transparent portion.

12. A panel adapted to be attached to a roll over protective structure of a vehicle to enclose an operator's station comprising a polygonal member having at least four sides, said member having a peripheral channel defining a free edge around the perimeter of said panel, a compressible sealing element carried by the free edge and adapted to engage and seal with a post forming part of said protective structure, means defining a clip on lip along at least a portion of an upper edge of said member for suspending said panel on an upper portion of the protective structure, and releasable retaining means along at least a lower portion of two opposed sides extending from said one side and spaced therefrom for releasably retaining the panel on the protective structure.

13. A panel as defined in claim 12, in which each releasable retaining means includes vibration absorbing means for isolating the panel from the roll over protective structure.

* * * * *